United States Patent
Mornhineway et al.

(10) Patent No.: US 8,508,345 B2
(45) Date of Patent: Aug. 13, 2013

(54) REMOTE CONTROL ACCESSORY FOR A WIRELESS COMMUNICATION SYSTEM

(75) Inventors: David Mornhineway, San Antonio, TX (US); Mark Hubscher, San Antonio, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 670 days.

(21) Appl. No.: 12/509,128

(22) Filed: Jul. 24, 2009

(65) Prior Publication Data

US 2011/0023081 A1     Jan. 27, 2011

(51) Int. Cl.
*H04N 7/16*     (2006.01)

(52) U.S. Cl.
USPC .................. 340/12.55; 340/4.3; 340/12.22

(58) Field of Classification Search
USPC ............ 340/12.22, 12.23, 12.24, 12.25, 12.5, 340/12.52, 12.53, 13.24, 4.11, 5.1, 13.2; 726/9, 10, 20; 345/173
See application file for complete search history.

(56) References Cited

U.S. PATENT DOCUMENTS

| | | | | |
|---|---|---|---|---|
| 5,372,225 A | * | 12/1994 | Joynes et al. | ............ 191/12.2 R |
| 7,207,059 B1 | | 4/2007 | Kurian et al. | |
| 7,274,303 B2 | | 9/2007 | Dresti et al. | |
| 2006/0084284 A1 | * | 4/2006 | Hsieh | .............................. 439/31 |
| 2007/0080823 A1 | * | 4/2007 | Fu et al. | ................... 340/825.22 |
| 2007/0256126 A1 | | 11/2007 | Erickson et al. | |
| 2008/0068207 A1 | * | 3/2008 | Elberbaum | ............. 340/825.72 |
| 2008/0080703 A1 | * | 4/2008 | Penning et al. | .......... 379/428.02 |
| 2008/0288707 A1 | * | 11/2008 | Nicolet | ......................... 710/310 |
| 2008/0297369 A1 | * | 12/2008 | Pittard et al. | ............. 340/825.22 |
| 2009/0277668 A1 | * | 11/2009 | Kinyon | ......................... 174/254 |
| 2010/0323621 A1 | * | 12/2010 | Slamka et al. | ............... 455/41.3 |

OTHER PUBLICATIONS

Remote Control Extender (Next Generation Home Products), 2001.*
Product Comparison Matrix Published Sep. 2007.

* cited by examiner

*Primary Examiner* — Nabil Syed

(74) *Attorney, Agent, or Firm* — Guntin & Gust, PLC; Jay H. Anderson

(57) ABSTRACT

A system that incorporates teachings of the present disclosure may include, for example, a remote control accessory for a wireless communication system, including a radio frequency (RF) to infrared (IR) converter for receiving RF signals transmitted thereto and converting the RF signals to IR commands, a plurality of IR transmitters for transmitting the IR commands, and a housing assembly for carrying the RF to IR converter and the plurality of IR transmitters. The plurality of IR transmitters are integrated into the housing assembly with no exposed wires. Other embodiments are disclosed.

14 Claims, 10 Drawing Sheets

200

700

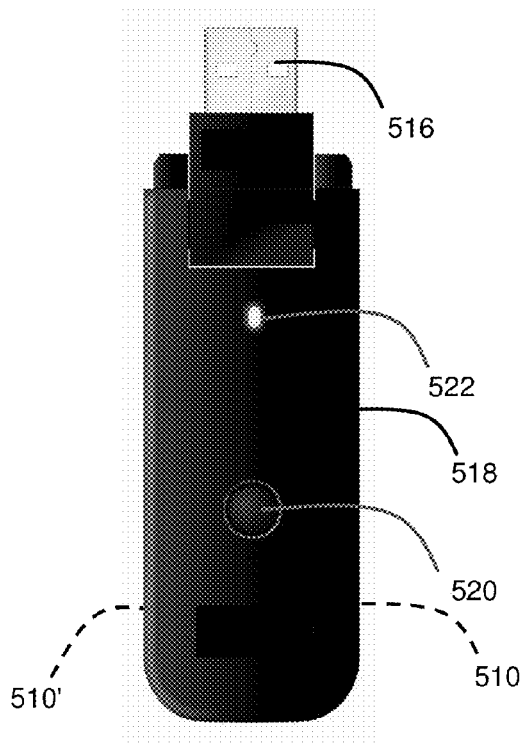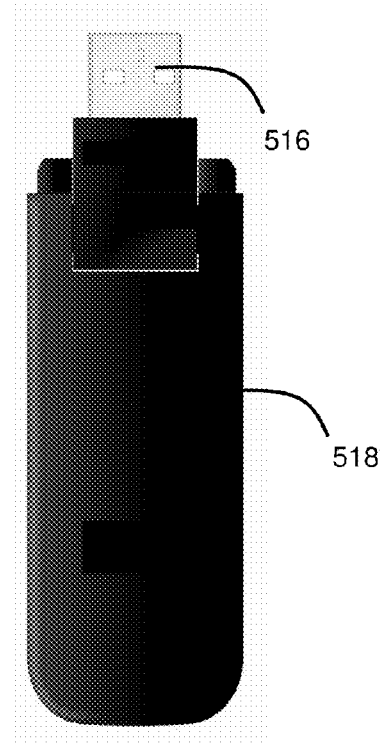
FIG. 9  FIG. 10

Top

Bottom

US 8,508,345 B2

REMOTE CONTROL ACCESSORY FOR A WIRELESS COMMUNICATION SYSTEM

FIELD OF THE DISCLOSURE

The present disclosure relates generally to a wireless communication system and, more specifically, to a remote control accessory for a wireless communication system.

BACKGROUND

Communication systems and electronic systems normally comprise a plurality of separate components that are coupled together either by cabling or communicate via wireless communication. Relying on cables can become cumbersome and unsightly when the number of cables increases to handle various components and peripheral devices. On the other hand, while wireless communication solutions reduce or eliminate the number of cables utilized to couple the various components, such wireless communications systems require the components to be in direct line-of-sight for proper operation.

BRIEF DESCRIPTION OF THE DRAWINGS

FIGS. 9 and 10 depict an illustrative embodiment of a remote control accessory operating in portions of the communication systems of FIGS. 1-2;

DETAILED DESCRIPTION

One embodiment of the present disclosure can entail a remote control accessory for a wireless communication system, including a radio frequency (RF) to infrared (IR) converter for receiving RF signals transmitted thereto and converting the RF signals to IR commands, a plurality of IR transmitters for transmitting the IR commands, and a housing assembly for carrying the RF to IR converter and the plurality of IR transmitters. The plurality of IR transmitters are integrated into the housing assembly with no exposed wires.

Another embodiment of the present disclosure can entail a radio frequency remote control for a wireless communication system, including a processor for processing information, a user interface for entering the information, an RF transmitter which transmits RF signals, and a housing for carrying the processor, the user interface, and the RF transmitter, wherein the RF transmitter transmits the RF signals to a remote control accessory comprising a dongle having an RF to IR converter and a plurality of IR transmitters which are integrated into the dongle with no exposed wires.

Yet another embodiment of the present disclosure can entail a set-top box, including a controller to receive a request for communication services from a remote control accessory communicatively coupled to the STB via a port disposed on the STB, wherein the remote control accessory converts radio frequency signals to infrared commands and sends the IR commands to the STB via a plurality of IR transmitters which are integrated within the remote control accessory, and wherein the IR commands are received by an IR sensor of the STB.

Figure 1:
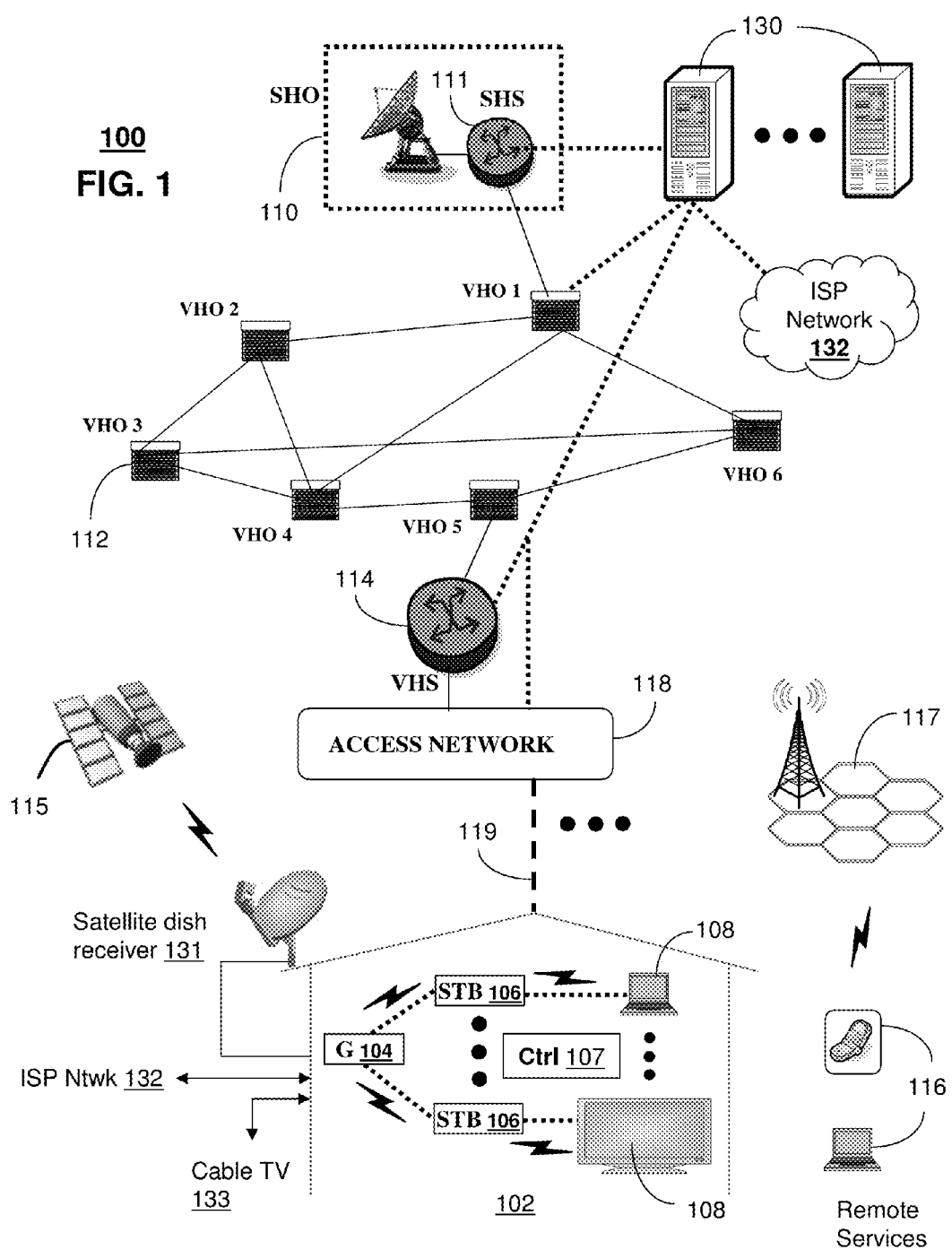
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
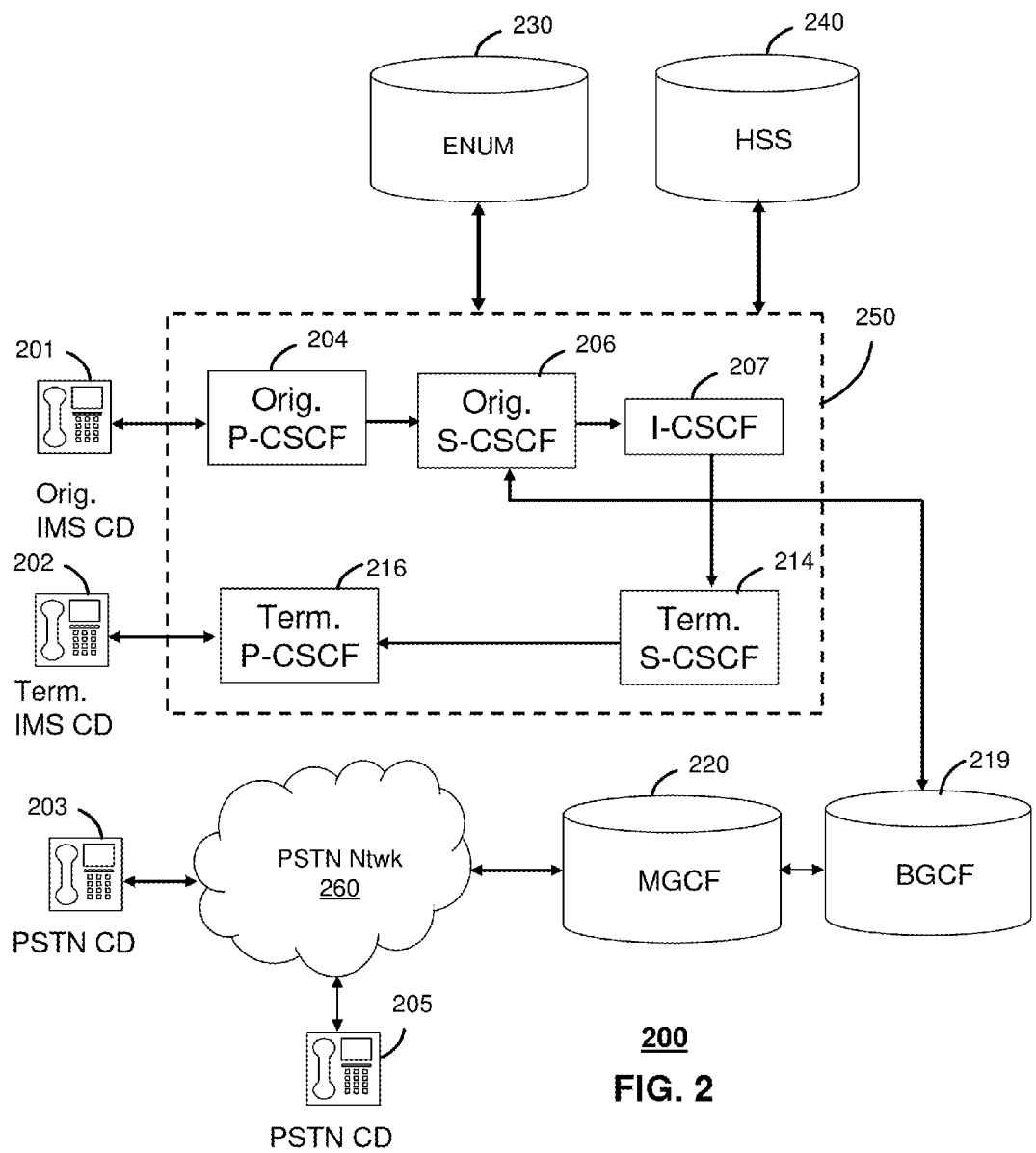

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
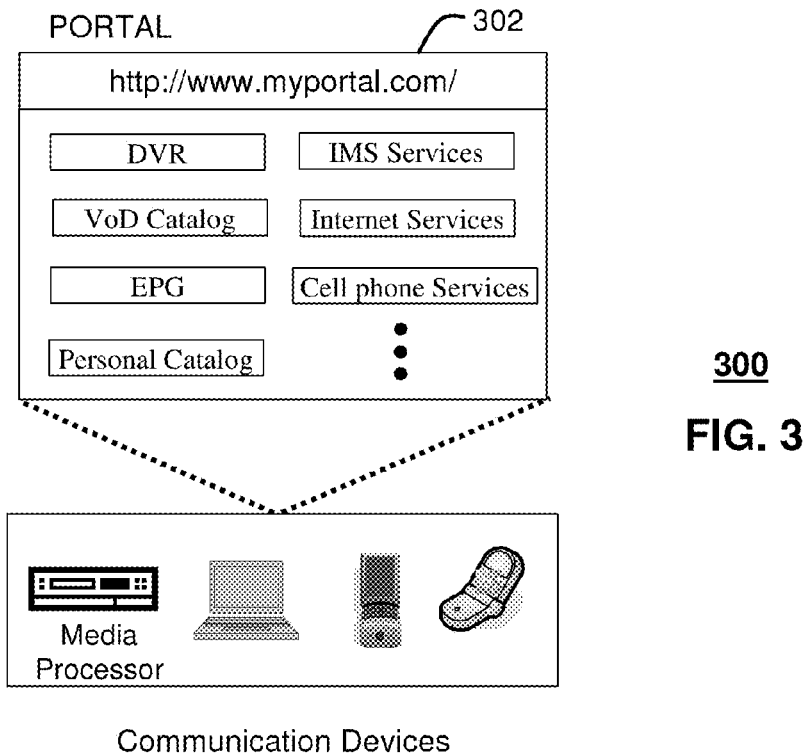
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
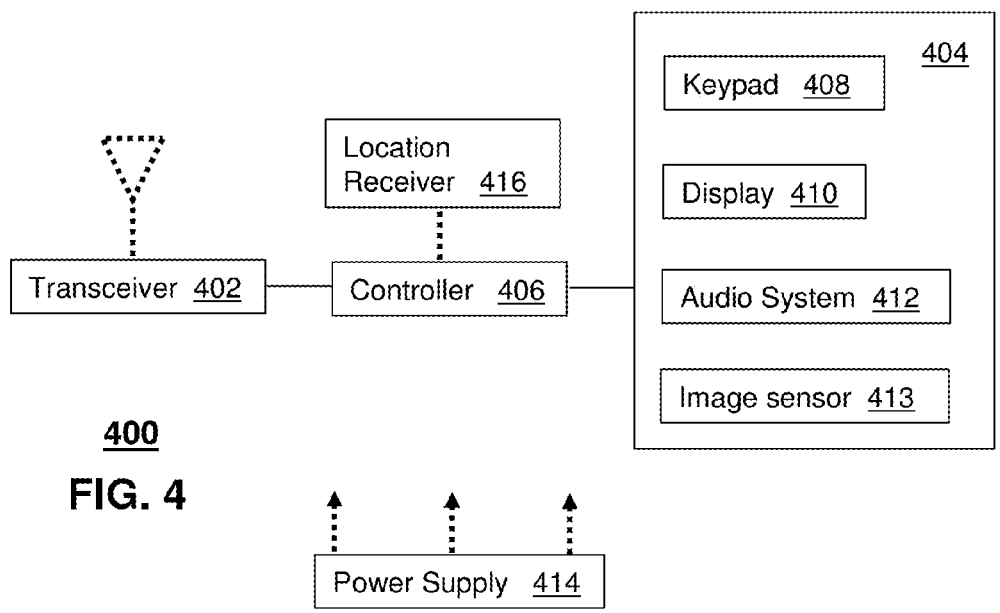
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
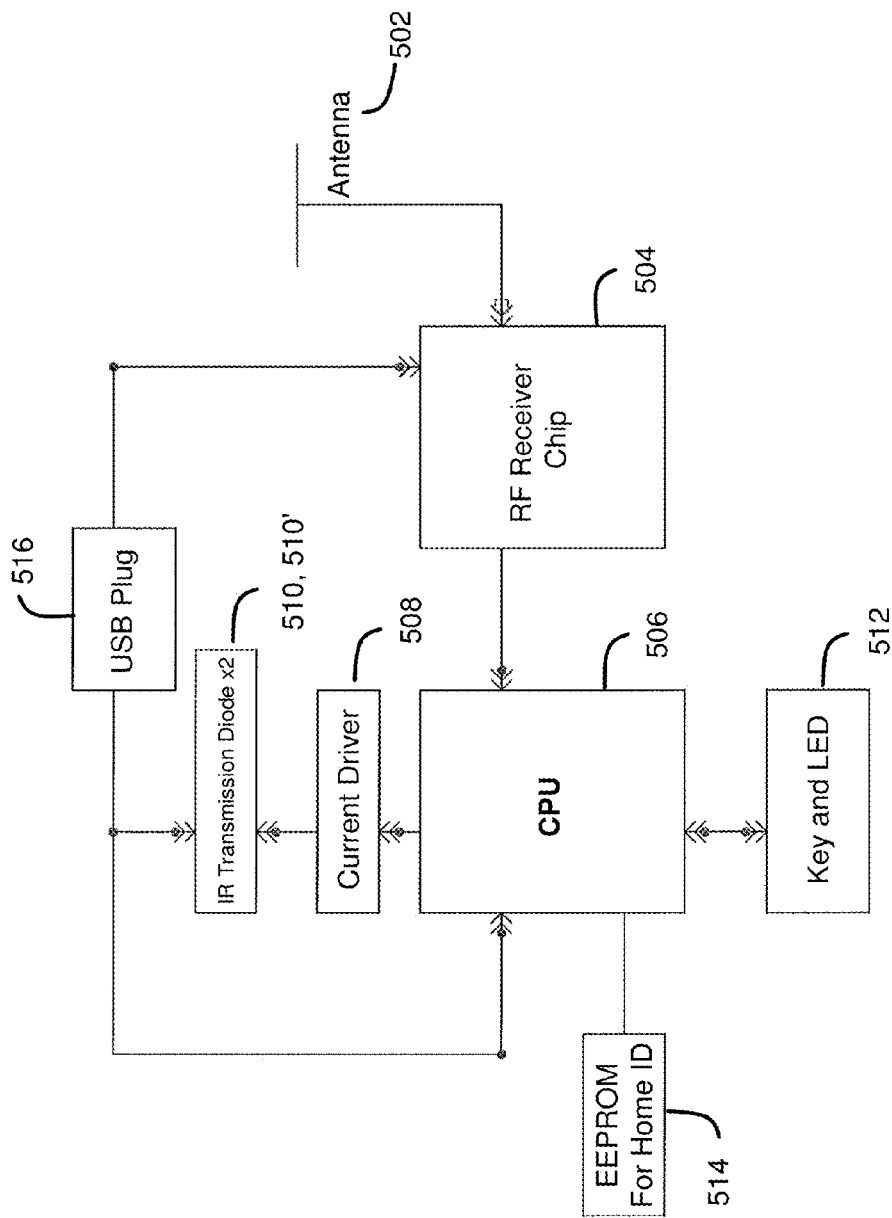
FIG. 5 schematic view of an illustrative embodiment of a remote control accessory operating in portions of the communication systems of FIGS. 1-2.

FIG. 5 depicts a schematic view of a remote control accessory 500 that operates in portions of the communication system of FIG. 1. The remote control accessory 500 is operative to be used together with a media controller 107 (see FIG. 1) such as, for example, a radio frequency (RF) remote control to access and control a media processor 106 (see FIG. 1) such as, but not limited to, an infrared IR receiver or a set-top box (STB) (the RF remote control and STB will be described in detail below).

The remote control accessory 500 and RF remote control allow an end-user the ability to use the RF remote control to change channels, volume control, and perform all functions currently enabled by an infrared remote control and an STB, without the limiting factor of line-of-sight operation which is inherent with such infrared controlled devices.

With reference to FIG. 5, the remote control accessory 500 includes but is not limited to an antenna 502 for receiving RF signals transmitted thereto by the RF remote control, an RF receiver chip 504, a control processor unit (CPU) 506, a current driver 508, and a plurality of IR transmitters such as IR transmission diodes 510 and 510' for transmitting the IR commands. A key and LED 512 and an electrically erasable programmable read-only memory (EEPROM) for home ID 514 may also be included. The antenna 502, RF receiver chip 504, and CPU 506 together form an RF to IR converter for receiving RF signals transmitted thereto and converting the RF signals to IR commands. Of course, the RF to IR converter can include more or less elements than those identified. As will be described in more detail below with respect to FIGS. 9-14, the remote control accessory 500 may take the form of a dongle having a coupling member 516 which is coupled to a port in the STB. The coupling member 516 may comprise a universal serial bus (USB) connector and the port comprises a corresponding USB port. Also, although not shown in FIG. 5, the dongle includes a housing assembly for housing the RF to IR converter and the plurality of IR transmitters, etc., and is described in more detail below with respect to FIGS. 9-14.

Figure 7:
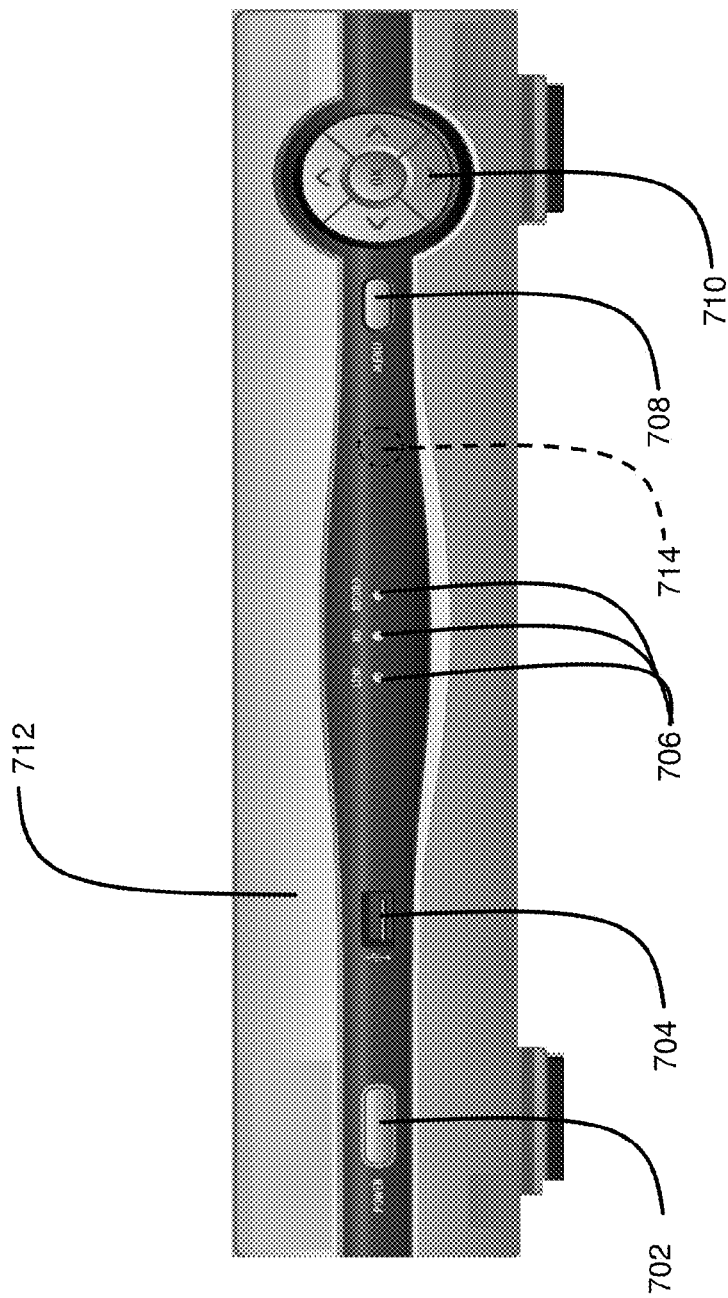
FIG. 7 depicts an illustrative embodiment of a media processor operating in portions of the communication systems of FIGS. 1-2.

An illustrative embodiment of the media processor 106 is shown in more detail in FIG. 7 as IR receiver or STB 700. The STB 700 includes the standard power button 702, the port mentioned above and shown as a USB port 704, indicator lights 706, a menu button 708, and directional keys 710 all arranged on a front panel 712 of the STB 700. An IR sensor eye 714 is disposed in the front panel 712 just to the right of the indicator lights 706 in the black strip area which forms a colored lens. The IR sensor eye 714 receives the IR commands from the IR transmitters 510, 510'.

Figure 6:
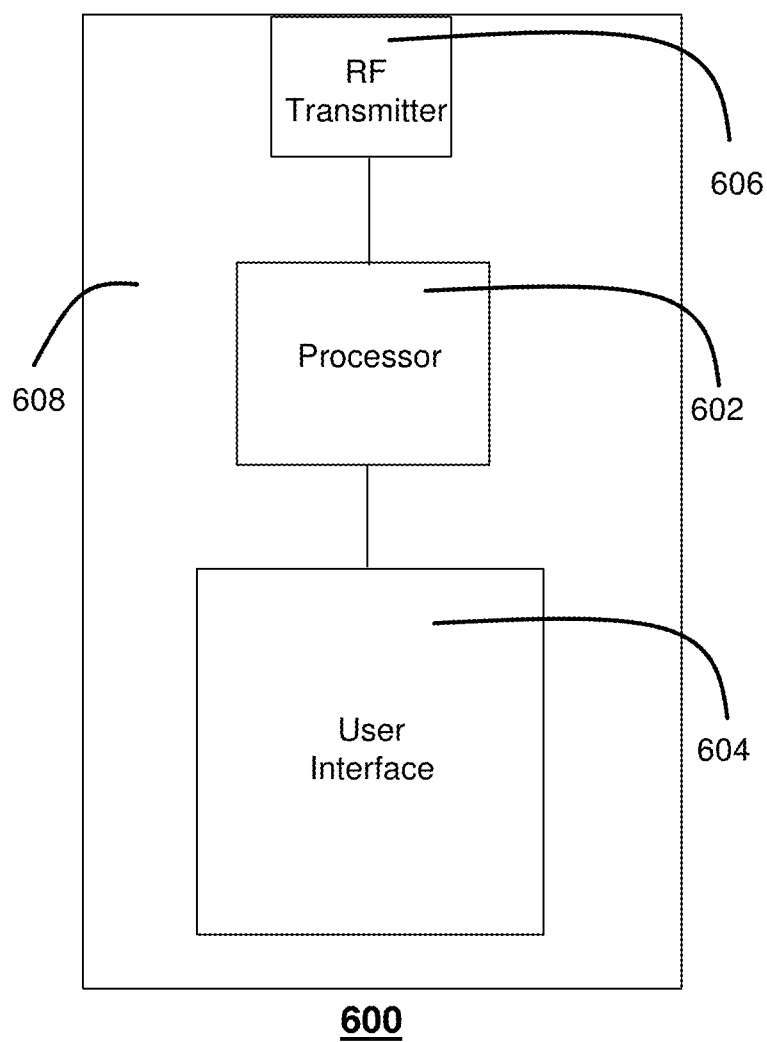
FIG. 6 schematic view of an illustrative embodiment of an RF remote control operating in portions of the communication systems of FIGS. 1-2.
Figure 8:
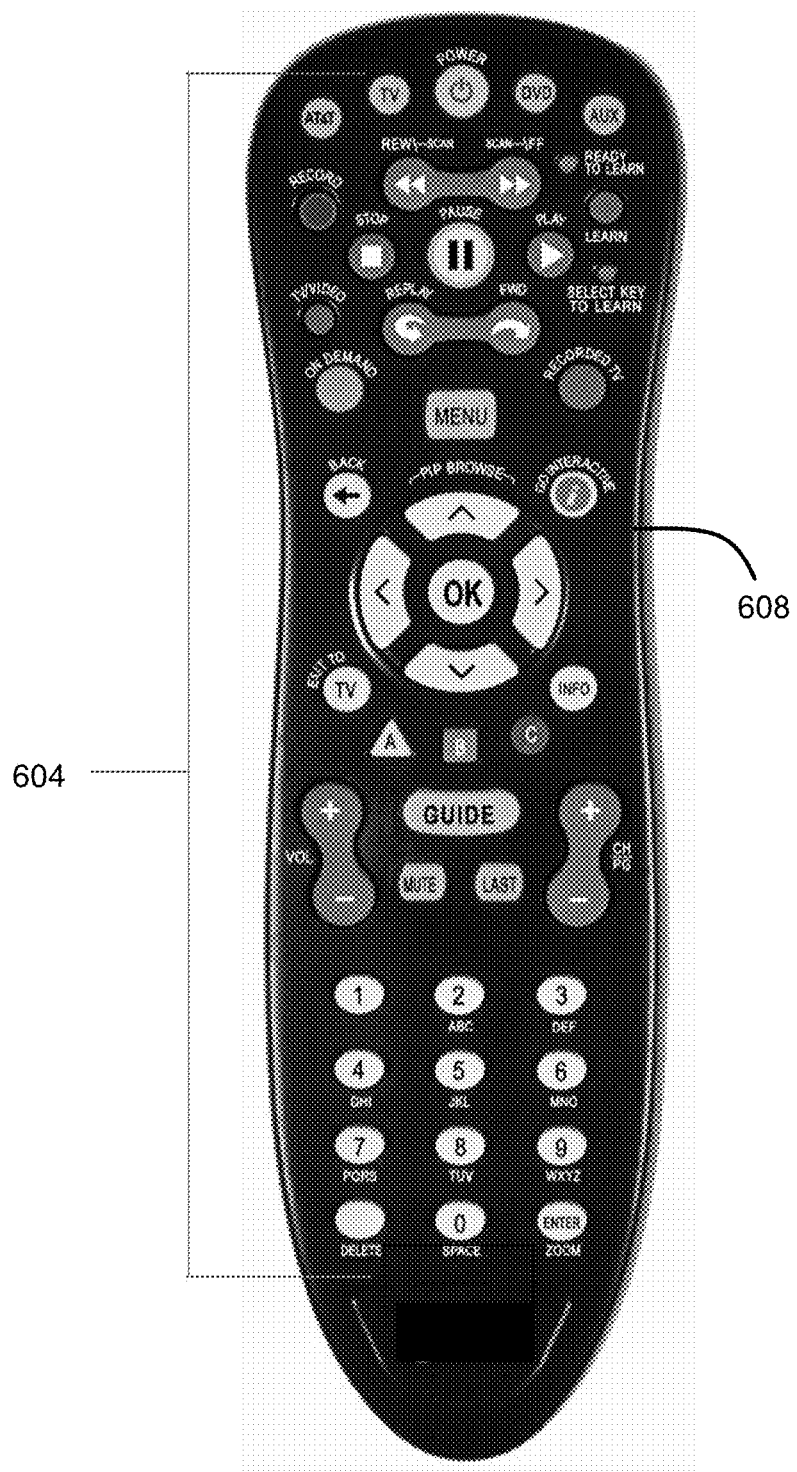
FIG. 8 depicts an illustrative embodiment of an RF remote control operating in portions of the communication systems of FIGS. 1-2.

The RF remote control 600 for a wireless communication system is shown schematically in FIG. 6 and an illustrative embodiment thereof is shown in FIG. 8. With reference to FIG. 6, the RF remote control 600 includes a processor 602 for processing information, a user interface 604 for entering the information, an RF transmitter 606 which transmits RF signals, and a housing 608 for carrying the processor 602, the user interface 604, and the RF transmitter 606. The RF transmitter 606 transmits the RF signals to the remote control accessory 500. The RF signal may be a standard RF, Bluetooth, Wifi, ZigBee, Z-Wave or the like.

FIG. 8 shows the exterior of the RF remote control 600 in more detail. The housing 608 may be a handheld, battery operated device formed of plastic and carrying the user interface 604. The user interface 604 may be in the form of keys, buttons, a touch screen or the like. As shown in FIG. 8, the RF remote control 600 includes the standard power key, channel keys, volume key, mode key, etc. The RF remote control 600 may be a universal remote.

The remote control accessory 500 will now be described in more detail with respect to FIGS. 9-14. FIGS. 9 and 10 are top and bottom views, respectively, of an illustrative embodiment showing the remote control accessory 500 in the form of a dongle comprising a housing assembly 518 and the USB plug 516. The housing assembly 518 contains or carries the RF to IR converter and the plurality of IR transmitters, etc. As shown in FIG. 9, the top of the dongle includes a pairing button 520 and at least one indicator light 522 which corresponds to the key and LED of FIG. 5. The pairing button 520, when activated, places the remote control accessory 500 in a pairing mode to allow entry of an access code or key by using the RF remote control 600. The at least one indicator light 522, which may comprise an LED, such as a blue LED, either one of turns "OFF" or flashes in the pairing mode, and remains "ON" in a steady state when the remote control accessory 500 is in a use mode. This feature allows the user to change their home ID (see 514 in FIG. 5) or access code using, for example, any number from 0000 to 9999.

The plurality of IR transmitters 510, 510' comprise a pair of IR transmitters disposed on opposing sides of the housing assembly 518. The IR transmitters may comprise IR transmission diodes disposed 180° from each other such that the IR signal is sent out from both sides of the dongle through, for example, eyes on both sides of the housing assembly 518.

Figure 14:
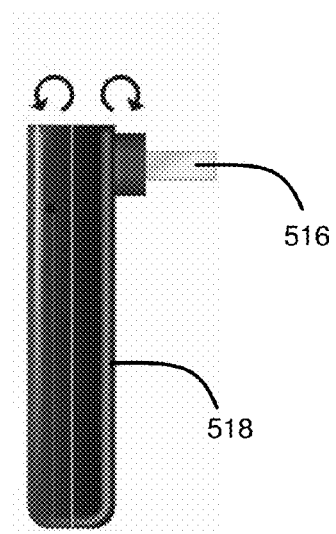
FIG. 14 illustrates the pivotable connection that may be utilized in all of the remote control accessory embodiments.

As best shown in FIG. 14, the coupling member 516 is pivotably mounted to the housing assembly 518 to allow the housing assembly 518 to pivot with respect to the STB when the coupling member 516 is inserted into the port 704 of the STB 700. This not only allows for space saving so that the housing assembly 518 may be positioned vertically in a small space, but also permits the housing assembly 518 to be pivoted up or down for optimum performance. While a pivot or swivel movement is shown using pivot pins, a universal coupling such as a roller ball connection is also contemplated for greater flexibility in adjustment.

Figure 11:
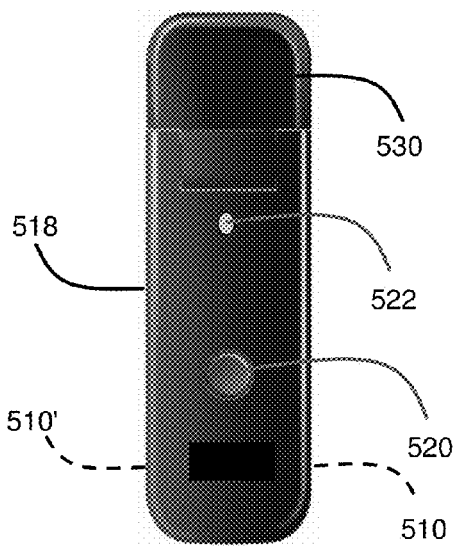
FIGS. 11 through 13 depicts another illustrative embodiment of a remote control accessory operating in portions of the communication systems of FIGS. 1-2.
Figure 12:
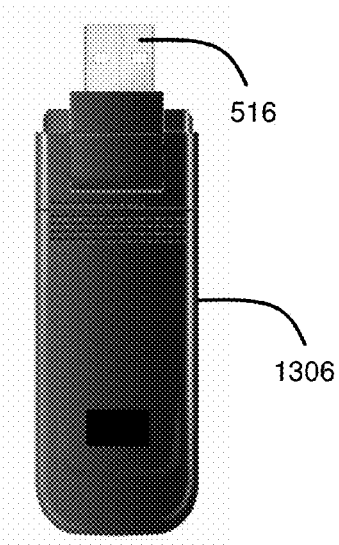
Figure 13:
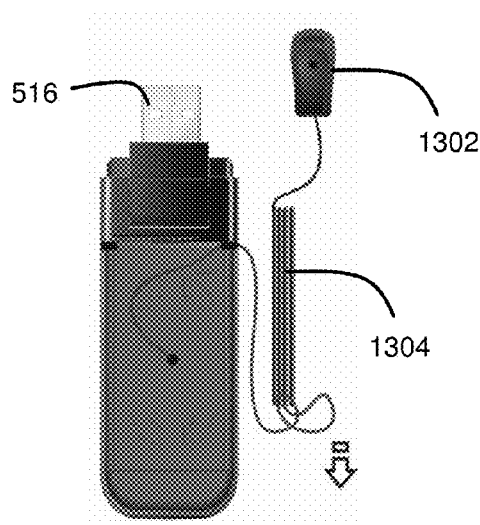

FIGS. 11-13 show another illustrative embodiment of the remote control accessory 500. Note that like reference numerals denote like elements. In addition to the two IR transmission diodes 510, 510' which are integrated within the housing assembly 518, a third IR transmitter 1302 may be tethered via a wire 1304 to the housing assembly 518 and is operative to be secured over the IR sensor eye 714 of the set-top box (STB) 700 using, for example, double-sided tape. The wire 1304 is stored within the housing assembly 518 prior to use, and unwinds to a desired length when in use. As shown in FIG. 12, a cover plate 1306 hides the wire 1304 when not in use, while FIG. 13 shows the cover plate 1306 removed. This embodiment permits the coupling 516 to be inserted into a corresponding port, such as a USB port, on the back or a surface other than the front part of the STB 700 or other similar device.

FIG. 11 further shows a coupling member or USB plug cover 530 which may be used in both embodiments of FIGS. 9-10 and FIGS. 11-13 to protect the coupling member 516 when not in use. The embodiment of FIGS. 11-13 may also utilize the pivotable connection as shown in FIG. 14 to permit the housing assembly to pivot up or down.

In operation, the RF signal range is between approximately 150 and 200 feet, while the IR signal range is approximately 30 feet. The remote control accessory 500 and the RF remote control 600 consistent with the present invention, allow the user the flexibility of not having to "point" the remote control at the STB 700 in order to change channels or access any of the STB 700 features. Moreover, the remote control accessory 500 is self-contained and powered by the, for example, USB port on the STB, thus avoiding cumbersome, unattractive and inefficient solutions. The remote control accessory 500 may be "Plug and Play" and hot pluggable. As can be seen from FIGS. 9-14, the remote control accessory 500 does not include a user interface for directly inputting infrared commands at the remote control accessory.

Upon reviewing the aforementioned embodiments, it would be evident to an artisan with ordinary skill in the art that said embodiments can be modified, reduced, or enhanced without departing from the scope and spirit of the claims described below. For example, while one indicator light is shown on the dongle, a plurality of multi-colored lights, such as LEDs, could be used to show the strength of, for example, the RF signal from the RF remote control. As an example, a green light to show a good signal, a yellow light to show a weak signal, and a red light to show no signal (i.e., signal is lost).

Other suitable modifications can be applied to the present disclosure without departing from the scope of the claims below. Accordingly, the reader is directed to the claims section for a fuller understanding of the breadth and scope of the present disclosure.

Figure 15:
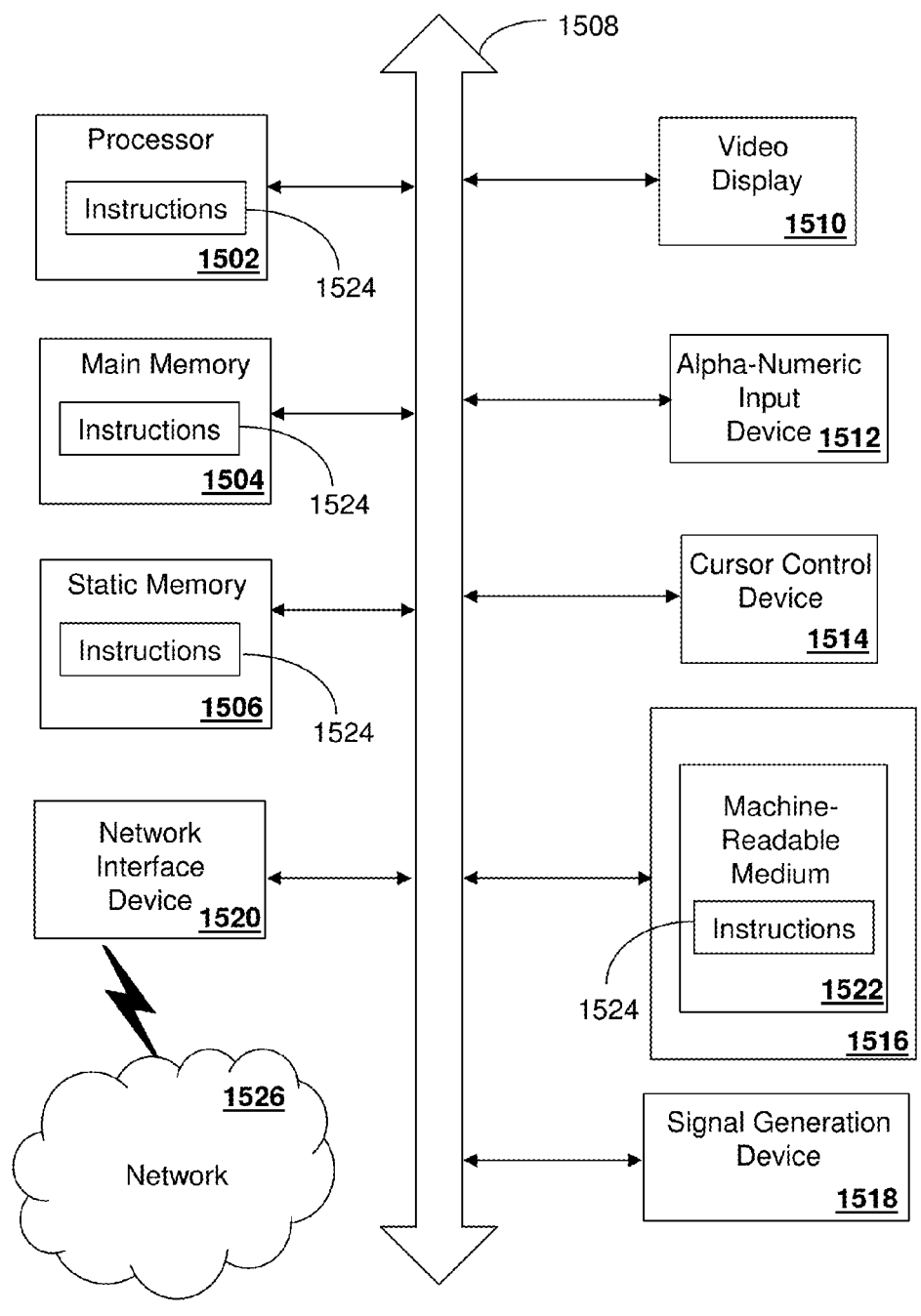
FIG. 15 is a diagrammatic representation of a machine in the form of a computer system within which a set of instructions, when executed, may cause the machine to perform any one or more of the methodologies discussed herein.

FIG. 15 depicts an exemplary diagrammatic representation of a machine in the form of a computer system 1500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, a solid state display, or a cathode ray tube (CRT)). The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a machine-readable medium 1522 on which is stored one or more sets of instructions (e.g., software 1524) embodying any one or more of the methodologies or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1524, or that which receives and executes instructions 1524 from a propagated signal so that a device connected to a network environment 1526 can send or receive voice, video or data, and to communicate over the network 1526 using the instructions 1524. The instructions 1524 may further be transmitted or received over a network 1526 via the network interface device 1520.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A remote control accessory for a wireless communication system, the remote control accessory comprising:
    a radio frequency to infrared converter that receives transmitted radio frequency signals and that converts the radio frequency signals to infrared commands;
    a plurality of infrared transmitters that wirelessly transmit the infrared commands to an infrared sensor eye of a media processor;
    a housing assembly that houses the radio frequency to infrared converter and the plurality of infrared transmitters, wherein the plurality of infrared transmitters are integrated into the housing assembly with no exposed wires, and wherein the remote control accessory does not include a user interface for directly inputting the infrared commands at the remote control accessory;
    a universal serial bus connector adjacent to and connected to the housing assembly, wherein the universal serial bus connector removably connects the remote control accessory with a universal serial bus port of the media processor, wherein the remote control accessory receives power only via the universal serial bus connector, and wherein the universal serial bus connector receives power via the universal serial bus port of the media processor without providing the infrared commands to the media processor via the universal serial bus port of the media processor; and
    a tethered infrared transmitter that is tethered via a wire to the housing assembly, the wire being connected to the housing assembly at a connection point proximate to the universal serial bus connector, the tethered infrared transmitter operative to be connected in proximity to the infrared sensor eye for providing the infrared commands to the infrared sensor eye of the media processor.

2. The remote control accessory of claim 1, wherein the housing assembly has a compartment that enables storage of the wire within the housing assembly when the tethered infrared transmitter is not in use.

3. The remote control accessory of claim 2, wherein the universal serial bus connector is pivotably mounted to the housing assembly to allow the housing assembly to pivot with respect to the media processor when the universal serial bus connector is inserted into a universal serial bus connector port.

4. The remote control accessory of claim 1, wherein the plurality of infrared transmitters comprise a pair of infrared transmitters disposed on opposing sides of the housing assembly.

5. The remote control accessory of claim 4, wherein the infrared transmitters comprise infrared transmission diodes disposed 180° from each other.

6. The remote control accessory of claim 1, wherein the wire is stored within the housing assembly prior to use, and unwinds to a desired length when in use.

7. The remote control accessory of claim 1, wherein the radio frequency signals are transmitted from an radio frequency remote control.

8. The remote control accessory of claim 7, wherein the remote control accessory is paired with the radio frequency remote control based on an access code, thereby allowing multiple remote control accessories and radio frequency remote controls to be used in a same vicinity without interference.

9. The remote control accessory of claim 8, wherein the housing assembly comprises a button which, when activated, places the remote control accessory in a pairing mode to allow entry of the access code using the radio frequency remote control.

10. The remote control accessory of claim 9, wherein the housing assembly comprises an indicator light which flashes in the pairing mode and which remains "ON" in a steady state when the remote control accessory is in a use mode.

11. A wireless communication system, comprising:
a radio frequency remote control and a remote control accessory,
wherein the radio frequency remote control comprises:
a processor for processing information;
a user interface for entering the information;
a radio frequency transmitter which transmits radio frequency signals; and
a housing for carrying the processor, the user interface, and the radio frequency transmitter, wherein the radio frequency transmitter transmits the radio frequency signals to the remote control accessory,
wherein the remote control accessory comprises:
a dongle having a radio frequency to infrared converter for generating infrared commands based on the radio frequency signals and a plurality of infrared transmitters which are integrated into the dongle with no exposed wires, wherein the remote control accessory does not include a user interface for directly inputting the information at the remote control accessory, wherein the dongle includes a universal serial bus connector that removably connects the dongle with a universal serial bus port of a media processor, wherein the dongle receives power only via the universal serial bus connector, and wherein the universal serial bus connector receives power via the universal serial bus port of the media processor without providing the infrared commands to the media processor via the universal serial bus port of the media processor; and
a tethered infrared transmitter that is tethered via a wire to the dongle, the wire being connected to the dongle at a connection point proximate to the universal serial bus connector, the tethered infrared transmitter operative to be connected in proximity to an infrared sensor eye of the media processor for providing the infrared commands to the infrared sensor eye of the media processor.

12. The wireless communication system of claim 11, wherein the radio frequency remote control is paired with the remote control accessory based on an access code, thereby allowing multiple radio frequency remote controls and remote control accessories to be used in a same vicinity without interference.

13. The wireless communication system of claim 12, wherein the processor sends commands via the radio frequency transmitter to the remote control accessory to change the access code.

14. A remote control accessory comprising:
a radio frequency to infrared converter that receives transmitted radio frequency signals and that converts the radio frequency signals to infrared commands;
an infrared transmitter that transmits the infrared commands;
a housing assembly that houses the radio frequency to infrared converter and the infrared transmitter, wherein the infrared transmitter is integrated into the housing assembly with no exposed wires, and wherein the remote control accessory does not include a user interface for directly inputting the infrared commands at the remote control accessory;
a coupling member which is coupleable to a media processor via a port of the media processor, wherein the coupling member is pivotably mounted to the housing assembly to allow the housing assembly to pivot with respect to the media processor when the coupling member is inserted into the port, wherein the remote control accessory receives power only via the coupling member, and wherein the coupling member receives power via the port of the media processor without providing the infrared commands to the media processor via the port of the media processor; and
a tethered infrared transmitter that is tethered via a wire to the housing assembly, the wire being connected to the housing assembly at a connection point proximate to the coupling member, the tethered infrared transmitter operative to be connected in proximity to an infrared sensor eye of the media processor, wherein the housing assembly has a compartment that enables storage of the wire within the housing assembly when the tethered infrared transmitter is not in use.

\* \* \* \* \*